United States Patent
Burks et al.

(10) Patent No.: US 12,214,986 B2
(45) Date of Patent: Feb. 4, 2025

(54) COLLATING MACHINE AND METHOD

(71) Applicant: Oasys Technologies Limited, Bedfordshire (GB)

(72) Inventors: Neil Burks, Bedfordshire (GB); Elliot James Lamb, Bedfordshire (GB)

(73) Assignee: Oasys Technologies Limited, Bedfordshire (GB)

( * ) Notice: Subject to any disclaimer, the term of this patent is extended or adjusted under 35 U.S.C. 154(b) by 842 days.

(21) Appl. No.: 17/289,288

(22) PCT Filed: Oct. 29, 2019

(86) PCT No.: PCT/GB2019/053060
§ 371 (c)(1),
(2) Date: Apr. 28, 2021

(87) PCT Pub. No.: WO2020/089611
PCT Pub. Date: May 7, 2020

(65) Prior Publication Data
US 2021/0395035 A1 Dec. 23, 2021

(30) Foreign Application Priority Data

Oct. 29, 2018 (GB) ........................ 1817655

(51) Int. Cl.
*B65H 9/12* (2006.01)
*B65H 31/34* (2006.01)
*B65H 43/08* (2006.01)

(52) U.S. Cl.
CPC ............ *B65H 43/08* (2013.01); *B65H 31/34* (2013.01)

(58) Field of Classification Search
CPC ... B65H 9/12; B65H 9/18; B65H 9/20; B65H 7/08; B65H 7/10; B65H 43/08; B65H 31/34; B65H 2553/24; B65H 2557/512; B65H 2511/514; B65H 2701/1914
See application file for complete search history.

(56) References Cited

FOREIGN PATENT DOCUMENTS

| | | | |
|---|---|---|---|
| EP | 2098469 A2 * | 9/2009 | ........... B65H 11/007 |
| GB | 1425321 | 2/1976 | |
| GB | 2025376 | 1/1980 | |
| GB | 2578474 | 5/2020 | |
| WO | WO0133163 | 5/2001 | |
| WO | WO2016156455 | 6/2016 | |
| WO | WO2017223484 | 12/2017 | |

* cited by examiner

*Primary Examiner* — Luis A Gonzalez
(74) *Attorney, Agent, or Firm* — STETINA BRUNDA GARRED & BRUCKER

(57) ABSTRACT

The present invention relates to an alignment system for sheets of material using a sensor to detect reference features in the sheets. The sensor uses components within or on the sheet to accurately position the sheet relative to the sensor and hence relative to a machine.

24 Claims, 8 Drawing Sheets

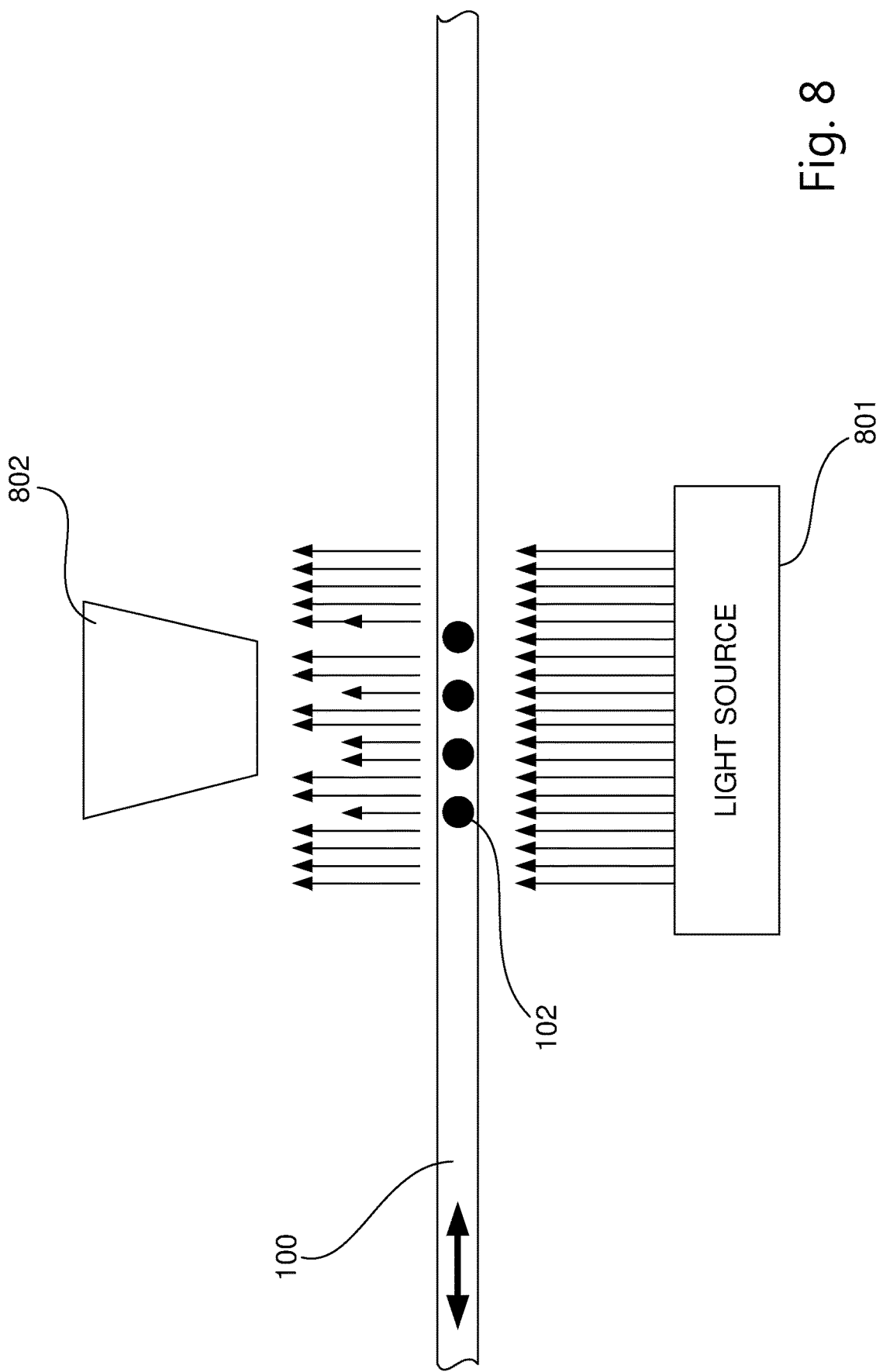

COLLATING MACHINE AND METHOD

CROSS-REFERENCE TO RELATED APPLICATIONS

The present application claims priority to PCT International Patent Application No. PCT/GB2019/053060, filed Oct. 29, 2019, and European Patent Application No. 1817655.2 filed on Oct. 29, 2018, the disclosures of which are incorporated herein by reference.

STATEMENT RE: FEDERALLY SPONSORED RESEARCH/DEVELOPMENT

Not Applicable

BACKGROUND

The present invention relates to machines for aligning or collating sheets of material, in particular to machines for collating component layers or sheets including components or elements prior to adhering or affixing them to other sheets or objects as part of a product assembly.

Composite films or sheets are used in many industries particularly where different properties or functions are provided by different elements within the composite sheet or when the product comprises multi layers in its construction. In particular this is often the case in the production of electronic or smart cards where various layers can make up the card structure including layers carrying features such as printing, security and electronic features that comprise the card structure providing functionality including RFID and NFC technology and security to the card. Such arrangements are typically used in banking, transport and other transaction and ID applications. Additional layers may be provided to provide images, additional machine readable functionality as well as protective and security layers etc.

Credit and smart cards are typically comprised of a number of layers—at least three in the case of a standard credit card, five to seven in the case of a contactless smart card and sometimes more than ten for a secure ID or driving licence card.

Other applications may require alignment of sheets or layers such as assembly of layers including electronic and or other metallic features.

In the case of cards such as smart cards and banking cards (payment cards) these may have complex structures to provide the desired functionality and security whilst also ensuring the elements of the card are adequately protected from damage in use. Where sheets are used for manufacture of such cards, each sheet may include parts of several cards in an array. When two or more sheets are to be brought together to form a composite structure, it may be necessary to accurately align one sheet with the other. This may, for example, be to ensure images, printing and other features in the component layers are correctly aligned.

For example, payment cards may include imagery which needs to be accurately aligned between layers. Modern cards typically contain electronic components, and these may be provided in different sheets within the structure. For example, a modern payment card may include a chip and an antenna component located at different levels through the card structure. In order to ensure reliable interaction, features must be accurately aligned to each other, as any misalignment may prevent correct functionality and reduce security of the card.

The above arrangement assumes a chip and an antenna for wireless (RFID, NFC) communication on payment or security cards, but alignment may be required between other elements. Often cards are provided with contact pads on their outer surface to allow direct connection, albeit temporary, with a card reading terminal.

It may also be desirable to line sheets up prior to carrying out mechanical operations on them such as separating the cards from the sheet by cutting or guillotining, or applying creases, markings or other elements to the sheets. Such processes may define the finished shape of the product such as a credit card and so need to be carried out with high precision.

The accuracy of alignment may therefore need to be extremely high, down to fractions of a millimetre. When these sheets are being processed, they may be in the form of extremely long continuous sheets hundreds of metres long (web) or smaller discrete sheets. However, these sheets need to be aligned with each other prior to joining them to each other typically either by welding and/or lamination. This is typically done by accurately aligning one sheet relative to a fixed reference such as the handling machine itself and then aligning the second sheet to the machine so that they can be accurately manoeuvred to ensure that they are properly aligned with each other.

Historically this might be achieved by simply relying on the sheets being a precise shape (typically rectangular) and using the edges of the sheet to provide a reference. This could be as simple as using a surface to push against a reference edge of the sheet to move it to a desired known position, so that the sheet is accurately aligned in one axis relative to the machine reference. The same process may then be used on a different edge to align the sheet in a perpendicular axis. By accurately positioning both edges and with the knowledge that the edges are perpendicular (or at some other defined angle) the precise position and orientation of the sheet can be fixed.

However, this method relies on the sheet having accurately defined edges relative to the features on the sheet. This imposes additional constraints on the production of the sheets and may also be difficult for extremely long sheets. It also means that the edges must be prevented from being damaged in transit and during preparation. Furthermore reliance on the condition and accuracy of the sheet edges introduces an additional accuracy tolerance.

As an alternative, rather than using the edges of the sheet, one or more reference marks may be printed on the sheet itself. This can be positioned inwards of the edge of the sheet and so is not reliant on the edge of the sheet being accurately defined. Instead, the handling machine uses a print sensor, camera or similar optical detector to identify the position of the mark in order to align the sheet relative to the machine and the associated sheets.

In this arrangement, the sheet may be fed into the machine and the sheet is monitored by the sensor/camera to determine when the mark on the sheet is positioned at a defined position relative to the machine and camera. This allows the mark to be aligned in a first axis relative to the machine. A similar arrangement may then be used to align the sheet in another axis. In this way the mark allows the sheet to be aligned to the machine and the mark is positioned at a defined position relative to the features on the sheet.

However, this requires an additional production step of providing the reference marks on the sheet which may require a separate printing stage in the manufacturing process of the sheet. This can add to the cost as well as require careful alignment of the printed mark to the sheet features.

This in itself may require a complex alignment process and adds an additional tolerance of the print mark position. It also means that the sheet can only be aligned if it is facing towards the cameras and from one side. Otherwise, reference marks would need to be provided on both sides of the sheet. Double sided printing further complicates the manufacturing process (and tolerances) and one-sided marks may limit the way the sheets are used as the machine using them may only have sensors/cameras arranged on one side and may need modification to utilise sheets with marks on the opposite side.

Consequently, the use of marks on the sheet can add significantly to the cost and has limitations in the flexibility of the sensing/detection.

The use of marks also requires the marks to be produced with high accuracy to achieve accurate alignment. This is turn requires cameras or optical sensors capable of accurately detecting and locating the marks. This requires the camera to be positioned accurately relative to the marks to ensure that they are in focus, to achieve desired accuracy. If the mark is not in focus, the edge may be harder to discern, and accurate alignment may not be achievable.

There is therefore a desire to be able to accurately align component layers and sheets in collating and assembly machines and the like without having to rely on accurately manufactured edges or the application of reference marks on the sheets.

SUMMARY

Therefore, according to the present invention there is provided an apparatus for aligning a sheet of material relative to said apparatus, said apparatus comprising: one or more sensors, each arranged at a known position relative to said apparatus and arranged to detect a sensor feature in said sheet; a first moving means for adjusting the relative position of said sheet and a first of said one or more sensors; and a controller arranged to receive output from said first sensor and to control the first moving means to align said first sensor feature with said first sensor.

By utilising the sensor, the apparatus is able to determine the position of features within or on the sheet, to accurately position the sheet for alignment with another sheet or object or with a processing machine for carrying out a mechanical process such as cutting, punching or even scanning. By using features which may be functional components of the sheet which may require precise alignment, the sheets can be accurately positioned without the need to use separate positional markers such as printed marks which may themselves introduce additional errors and require additional and often complex processing steps.

The apparatus may further comprise a second sensor arranged at a known position relative to said apparatus and arranged to detect a second sensor feature in said sheet; and a second moving means for moving said sheet relative to said apparatus, wherein said controller is arranged to receive output from the second sensor and to control the second moving means to align said second sensor feature with said second sensor.

The use of a second sensor allows the sheet to be manipulated more accurately and also to differentially shift the parts of the sheet to induce a rotational (yaw) as well as translational movement in the plane of the sheet.

The controller may be arranged to carry out a first alignment step to align said first sensor feature with said first sensor using said first moving means prior to carrying out a second alignment step to align said second sensor feature with said second sensor using said second moving means.

The controller may repeat said first and second alignment steps one or more times. This allows any offset error induced in the initial positioning by a subsequent step to be reduced by iteratively positioning the sheet accurately.

The first and second moving means are preferably arranged to independently manipulate said sheet to selectively translate said sheet in a first direction or rotate said sheet. By moving different parts of the sheet, they can be translated by the same amount to translate the entire sheet or they can be moved differentially which will tend to induce a rotational (yaw) movement as well as some possible translation. This allows the sheets to be accurately positioned to accommodate any rotational or translational offset.

The apparatus may further comprise a third sensor arranged at a known position relative to said apparatus and arranged to inductively detect a third sensor feature in said sheet; and a third moving means for moving said sheet relative to said apparatus, wherein said controller is arranged to receive output from the third sensor and to control the third moving means to align said third sensor feature with said third sensor.

The controller is preferably arranged to carry out a third alignment step to align said third sensor feature with said third sensor using said third moving means after carrying out said first and second alignment steps, to align said third sensor feature with said third sensor using said third moving means.

The third moving means is arranged to move said sheet in a second direction different to said first direction.

The use of a third sensor, particularly if arranged to detect position based on movement in a different, preferably perpendicular, direction, the sheet can be aligned in multiple directions. This can be helpful where the features of the metallic components on the sheet have a similar profile across a section of sheet making accurate location in a direction along that direction difficult. This preferably uses a sensor location different to the sensors used for the first direction, to make use of features providing better locational accuracy, e.g. features which change as the sheet is moved in that different direction.

The one or more sensors may be inductive sensors suitable for inductively detecting metallic components within or on the sheet. The sheets may include various metallic components such as wires used for providing electrical connections or forming antennas. In this way, each of said first, second and/or third sensors can detect a metallic element in said sheet as the sheet is moved past the sensor to determine when the metallic element is at its closest to the sensor. In this way, as the feature is moved past the sensor the presence and passage of the metallic component can be detected to reliably determine its position relative to the sensor.

The one or more sensors may be also be arranged for detecting electromagnetic signals such as infra-red. One of the one or more sensors may be an infra-red detection means for detecting sensor features in said sheet. In this way, the intensity of infra-red light etc. passing through the sheet will be affected differently depending on the components within. This variation in intensity can be detected by the sensor to identify the position of the components. This will allow components that affect the passage of infra-red light differently to the sheet to be detected which could be metallic but also other types of component.

Preferably, an infrared light source is provided and directed towards the infrared detection means. This ensures a good and consistent intensity of light rather than relying on ambient infra-red light. By illuminating one side of a sheet, the infra-red light passes through the sheet and the infrared detection means positioned on the other side detects the light passing through. Alternatively, the sheet may be illuminated from the same side of the sheet. Some of the light will pass into the sheet and be reflected from the lower surface. Some of the light will be obstructed by components within the sheet and again the variation in intensity can be used to identify the position of the components.

Although, illumination using an infra-red light source helps to provide a good and consistent intensity of light, ambient infra-red light may be used. Furthermore, variations in the temperature of the components in the card will affect the infra-red light emitted which may also be detected by the infra-red detectors to differentiate the components within.

Each of said first, second and third movement means may be arranged to move the sheet relative the apparatus whilst the respective sensor is stationary relative the apparatus. Alternatively, the sheet may be held stationary whilst the sensor is moved relative to it. As long as the position of the sensor can be accurately determined relative to the apparatus, the position of the sheet can be determined and aligned relative to the apparatus.

Rather than separate sensor devices being used for each the first, second and third sensors, one sensor device may be used to provide two or more of the first, second and third sensors. This can be achieved by moving a single movable sensor between different defined locations relative to the apparatus corresponding to the respective sensors. The single sensor may act as two or more of the first, second and third sensors or multiple sensors may used. For example one sensor device may provide the first and second sensors with a second sensor device providing the third and possibly a fourth sensor.

The sensors may include a combination of inductive and infra-red sensors to either supplement each other to provide greater accuracy or to provide sensors adapted to specific types of sheet/component where one type of sensor may be more accurate than another.

The invention provides a means for aligning a sheet with the apparatus and with another sheet or sheets which are also aligned with the apparatus so that operations can be carried out on the plurality of sheets in a precisely aligned manner. The invention may also be used to align a sheet with an apparatus so that machining, other processing or scanning/reviewing of the sheet can be carried out by the apparatus, or other machinery aligned with the apparatus.

The invention also provides a method for aligning a sheet of material relative to a fixed reference, the method comprising: providing a first sheet for alignment with said fixed reference, said first sheet having a first sensor feature; a first moving step of moving said sheet in a first direction relative to a first sensor arranged at a known position relative to said fixed reference, detecting said first sensor feature in said sheet using said first sensor; and ceasing movement of said sheet when said first sensor feature is positioned at a defied position relative to said first inductive sensor.

BRIEF DESCRIPTION OF THE DRAWINGS

The present invention will now be described in more detail by reference to the following detailed embodiments and by reference to the drawings in which:

FIG. 3 shows a simplified version of the machine with a sheet passing through;

FIG. 8 shows a schematic view of the sensor used in an alternative embodiment.

DETAILED DESCRIPTION

Figure 1:
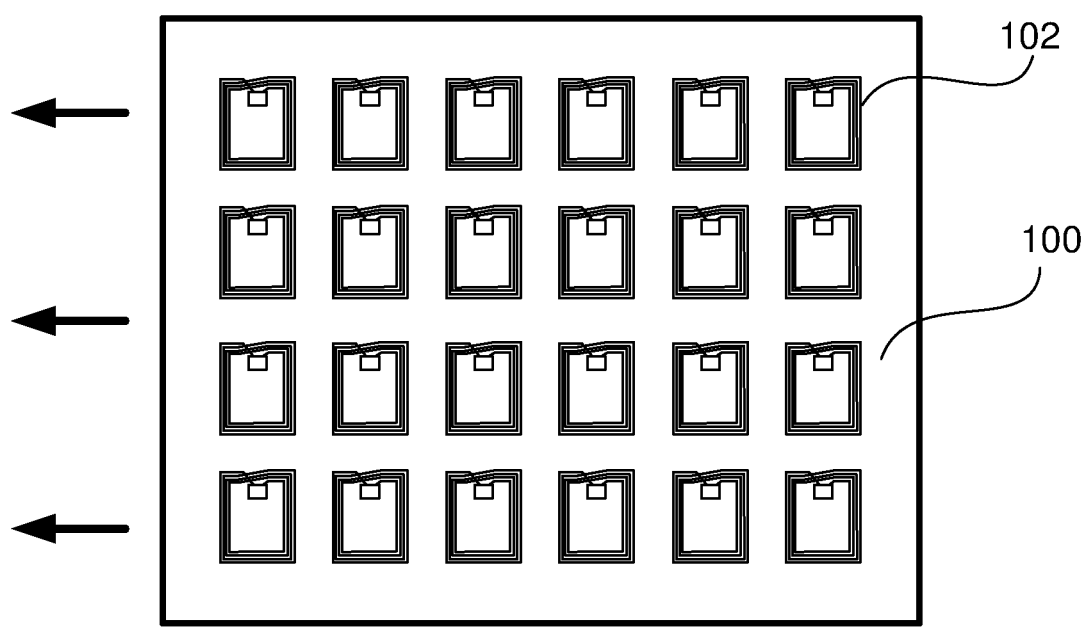
FIG. 1 shows a section through an exemplary sheet carrying electronic circuitry.

FIG. 1 shows a sheet 100 of material carrying electronic components; in this case a simple spiral wound metallic component 102 serving as an antenna part of a payment card. In this example, the component is a simple wire embedded in the sheet but this could take other forms e.g. it could be etched, printed, etc. It will be appreciated that the precise function of the component 102 is not limited to being an antenna and may in fact be a simple connection, an electronic device such as a chip, or even non-functional components such as surface treatment or even printed ink as long they are able to be detected inductively (e.g. metallic ink). Whatever the form, a key feature is that the sheet has a component that can be detected inductively.

In this example, the component 102 is a wire embedded into the substrate of the card. Whilst it is visible in the section of FIG. 1, it may be completely contained within the substrate of the sheet on partially or completely obscured and so not visible externally.

The sheet is shown with a number of similar elements and in this example may be used as part of the process of fabricating a composite sheet that is ultimately divided up to produce a plurality of separate cards. However, during the manufacturing process, it is convenient to produce cards in bulk with the elements of several cards on one sheet.

In a fabrication process, one element will typically be fed into a processing machine from one direction and then the next element to be attached to it fed in from a different direction, although this is not essential. However, it allows a typical production assembly line arrangement where an initial component, usually a single sheet or a sheet extending from a continuous roll, to be fed in one end and passed along the line in one direction. The elements that are to be attached to it are then provided into the machines perpendicular to the direction of the assembly line to meet up with the initial component as it is added to. In other words, the initial component or base sheet is passed in a single direction and at each stage the next component to be added to it is fed in from one side or another to overlie it prior to being aligned and then engaged with it either temporarily or permanently. The combination can then continue along the production line to the next stage of assembly. Of course, this is not essential, and elements may change direction or even be introduced in different directions and with different orientations.

As shown in FIG. 2, in a typical arrangement, the base sheet 110 is passed along the direction of the assembly line to a station having the collation machine 120 where a sheet 100 such as that shown in FIG. 1 is to be engaged with it. The base sheet 110, which might be a base substrate sheet or a sheet containing the chip component arrives at the collation machine station under the control of the collation machine 120 and has already been accurately aligned relative to the collation machine 120. In other words, the precise position and orientation of it is known when it is at the station.

The sheet 100 must be aligned prior to attaching it to the base sheet 110. This may be done before or after the base sheet is passed into the collation machine 120. The base sheet may be a single sheet or may be a partial assembly of other sheets or carriers.

Figure 2A:
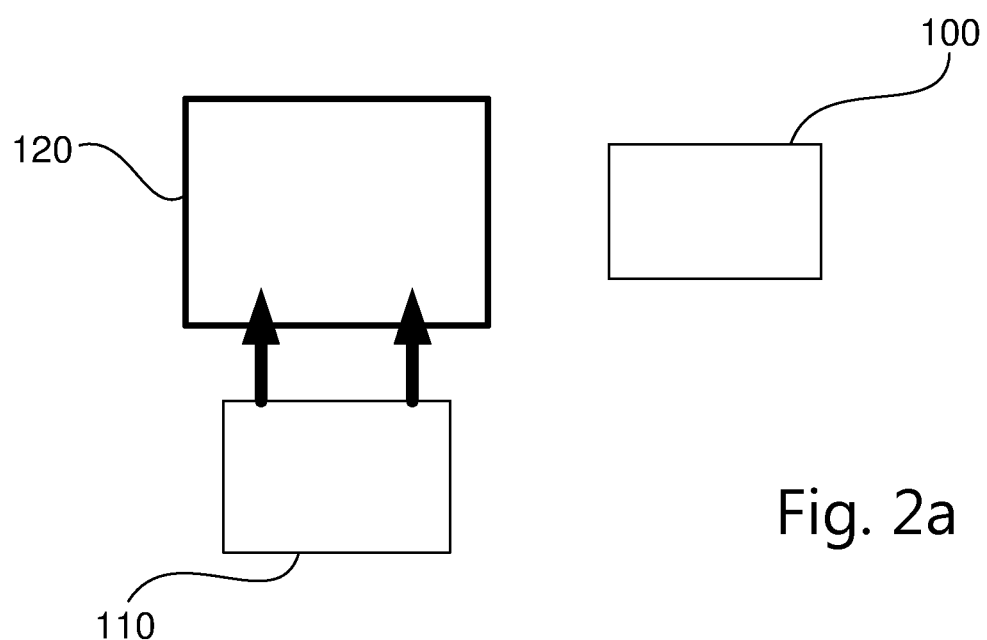
FIGS. 2a-2d show the basic processing steps of sheets passing through a machine.
Figure 2B:
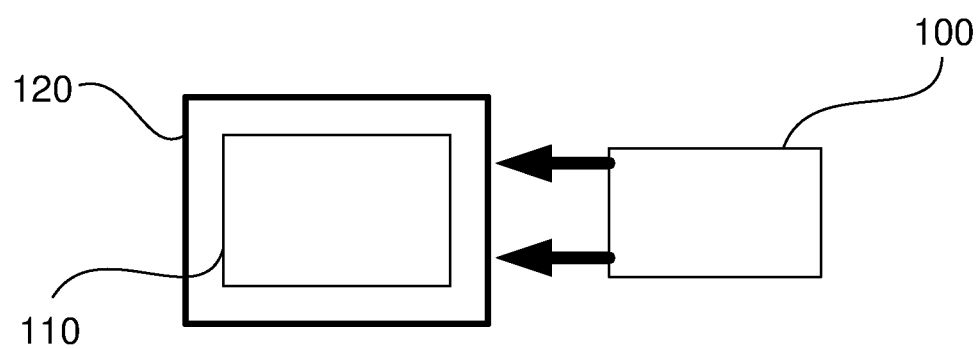
Figure 2C:
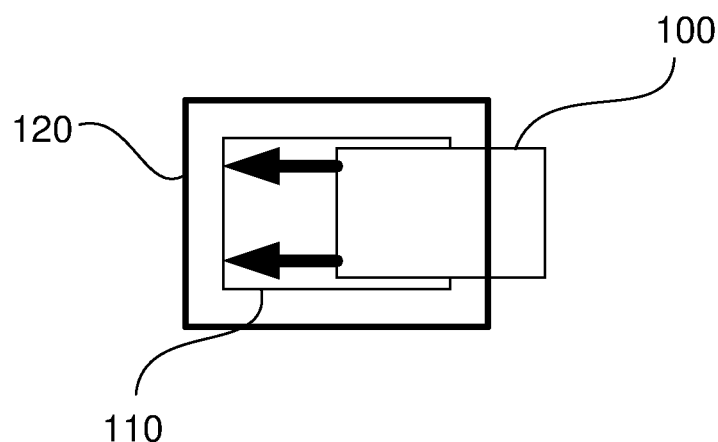
Figure 2D:
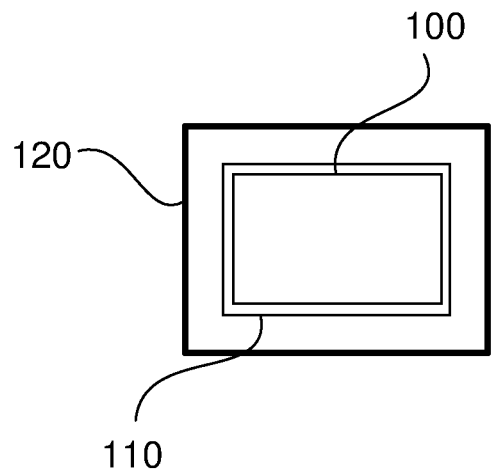

FIGS. 2a to 2c show the steps of a typically process. The base sheet 110 is passed to the collation machine 120 along an assembly line. In this example, the base sheet 110 is a single sheet but it could just as well be a continuous sheet. The sheet (or required part of a continuous sheet) is passed into the collation machine 120, as shown in FIG. 2a. Once in position, the sheet 100 to be aligned is passed into the collation machine 120 from one side, as shown in FIG. 2b. The sheet 100 enters the machine as shown in FIG. 2c and is moved into the desired position relative to the collation machine 120 and base sheet 110. Once it is in this position as shown in FIG. 2d, the accurate adjustment can be undertaken to ensure that the sheet 100 is accurately aligned with the base sheet 110.

Figure 3:
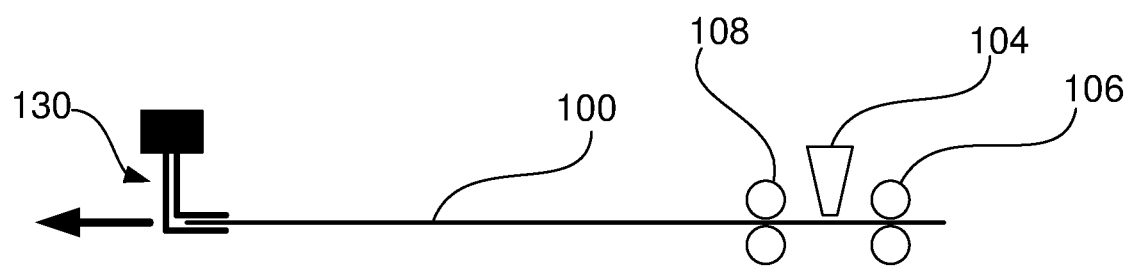

FIG. 3 shows a side view of the sheet 100 as it is passed into the collation machine 120. Only some of the elements of the machine are shown in FIG. 3. As described above, the sheet 100 is fed into the collation machine 120 from one side as shown by the arrow in FIG. 3. Once the sheet is in roughly in the correct position, it can then be accurately positioned. The base sheet 110 and the sheet 100 may be moved around in a number of ways. The edges of the sheets may be engaged by grippers 130 that grip the sheet 100 from either side. Alternatively, the sheet may be moved by using suction devices which attach to the sheet using a vacuum. Other methods such as rollers or pushers, may be used to transport and align the sheets.

In this embodiment, once the sheet 100 has been moved to the rough location required, the accurate positioning is carried out as follows. In the collation machine 120, a sensor 104, as shown schematically in FIG. 3, is provided which includes an inductive sensing element arranged to be positioned just above the plane of the sheet 100. As the sheet passes under the detector 104, the sensing element detects the metallic components 102 in the sheet 100. The inductive sensor is able to identify with a high degree of accuracy (typically in the region of 0.1 mm) the position of the components. By knowing the position of the components on the sheet, this allows the detector to work out the precise position of the sheet 100 in the direction of movement.

Figure 4:
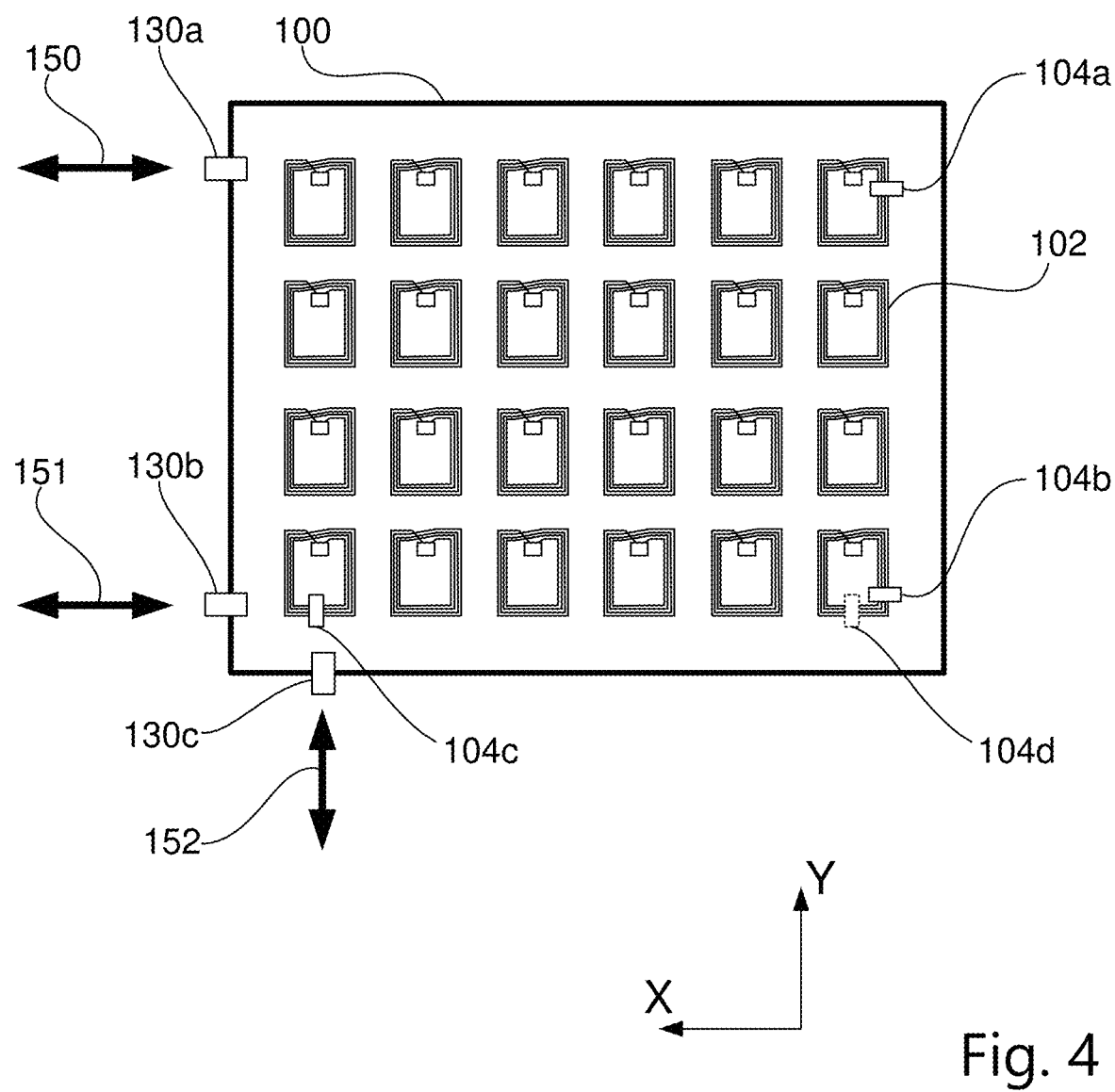
FIG. 4 shows the alignment process.
Figure 5:
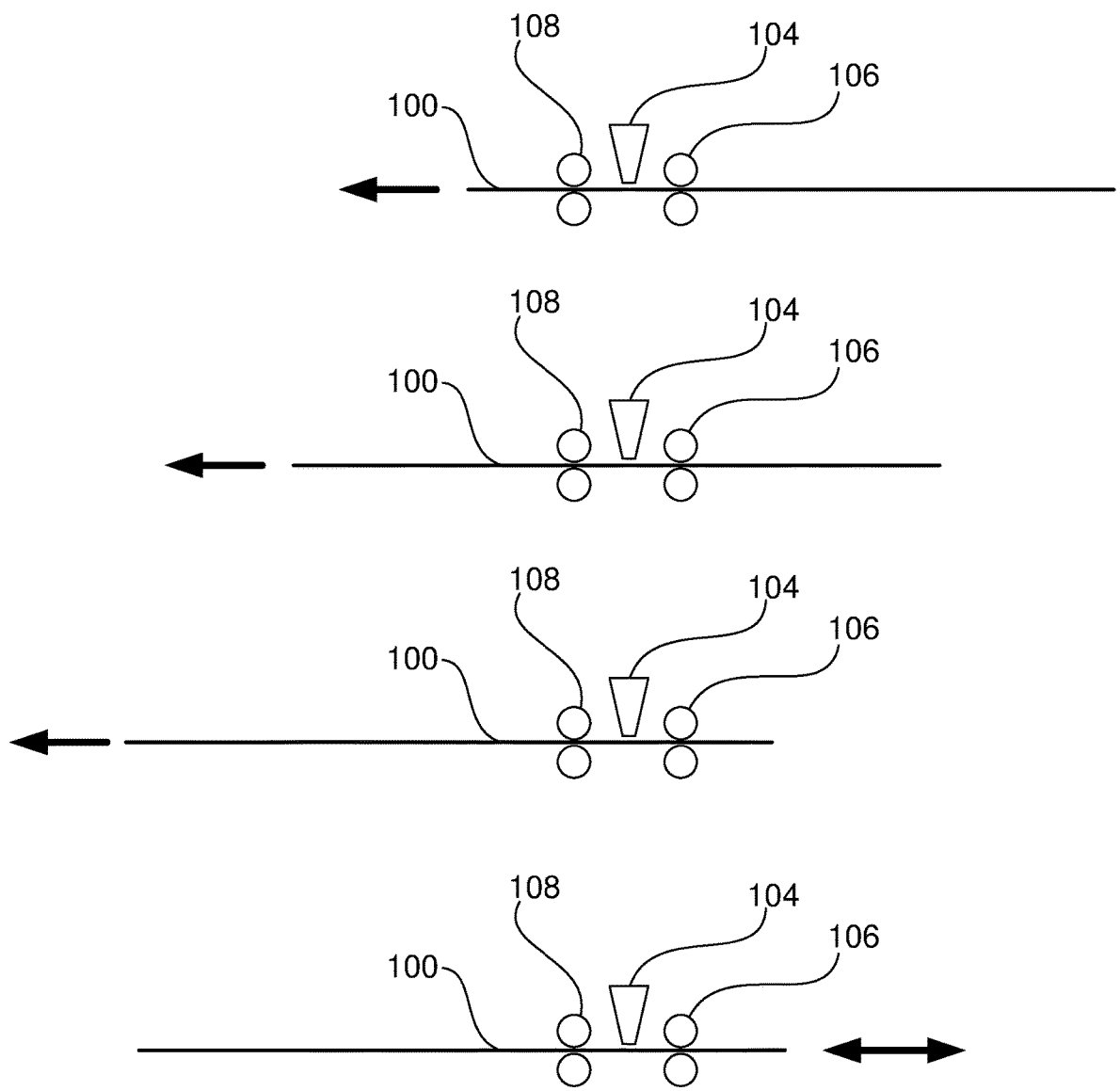
FIG. 5 shows the sequence of steps of the alignment process.

The alignment may be done in a number of ways. The sensor may monitor the metallic components 102 in the sheet as they pass under the sensor. FIG. 4 shows a typical layout of the sensors relative to a sheet 100 after it has been moved into the rough desired position. Sensors 104a and 104b see the sheet 100 pass under them as it is fed into the machine along the X-axis, i.e. from right to left in the drawing. FIG. 5 shows the stages of the sheet 100 being fed into the machine past a sensor 104. Once the sensor is in the rough position, fine adjustment is carried out by moving (150, 151) the sheet in and out to accurately position it relative to the sensor and hence the collation machine 120.

The sensor is able to detect the metallic components 102 of each of the features on the card. The output from the sensor is passed to a controller which is able to tie this output to the movement of the sheet 100. In this way, with knowledge of the structure of the components on the sheet, the controller is able to detect the passage of each of the features until, in the case of the sheet 100 shown in FIG. 4, the sixth feature has passed by the sensor. This allows the controller to determine that the sheet is in the roughly correct position and can then begin the process of accurate alignment.

Alternatively, the sheet may be completely fed into the machine and then partially withdrawn until the first metallic feature is detected. As a further alternative, the sheet may simply be moved by a predetermined amount roughly corresponding to the desired position without reference to the sensor output. Once in the rough position, the accurate adjustment may then be carried out using the sensor output.

Figure 6:
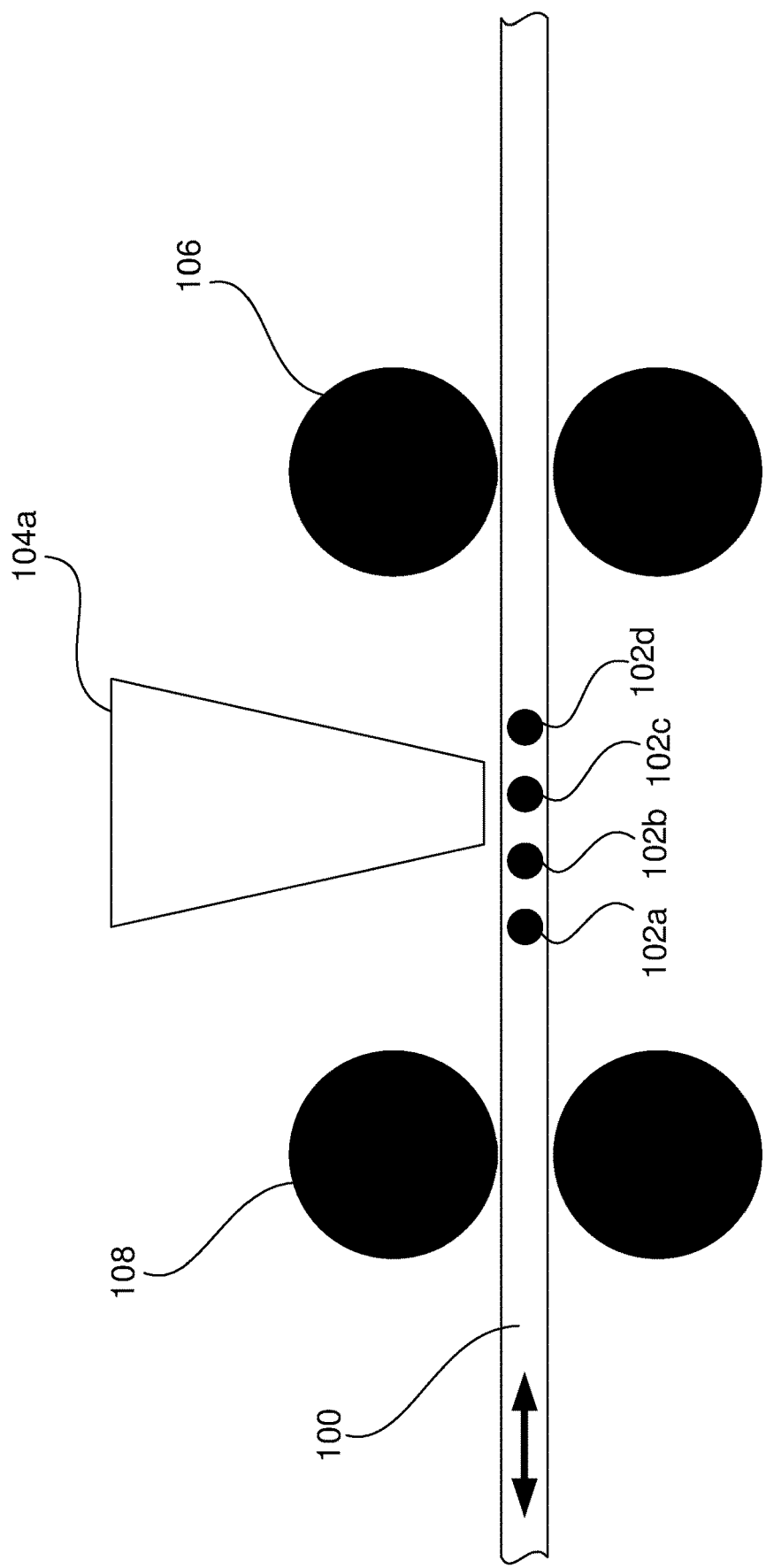
FIG. 6 shows a close up view of the detector and surrounding features.

FIG. 6 shows an enlarged view of the sensor region. The individual parts 102a-102d of the electronic components 102 can be seen embedded in the sheet 100. As noted above, the components 102 may alternatively be provided on the surface or even on the opposing surface or may be partially embedded but exposed. Due to the inductive nature of the sensor, it is not necessary for the components 102 to be visible. FIG. 6 also shows guides or rollers 106 and 108. These are optionally provided to guide the sheet 100. The rollers shown help to accurately maintain the separation between the sheet and the sensor. This can help to improve the detection and location accuracy of the sensors. The rollers are not required for moving the sheet although they may be used for that purpose too either in conjunction with or in pace of other means for moving the sheet.

In FIG. 6, the sheet 100 is initially moved past the sensor as described above until the final electronic components 102 have passed the sensor. As noted above, the sensor may monitor the components as they pass to monitor and determine the passage of the sheet through the machine. Although, for course adjustment, the movement may be controlled in other ways such as by simply measuring the movement of the grippers that move the sheet. Once the sheet is in the rough position, the sheet 100 is moved backwards and forwards to determine the precise position of the sheet relative to the sensor.

Starting from the position shown in FIG. 6, the sheet may initially be moved to the left until the final component 102d has passed by and beyond the sensor to confirm that the final component on the sheet has been detected. The sheet is then reversed so that it travels from right to left until the component 102d comes back into the range of the sensor. The signal from the inductive sensor will increase as the component 102d passes under it. This will reach a peak before declining again as the component begins to move beyond the sensor. This peak represents a precise and repeatable position of the sensor relative to the component. Once this is done, the sheet is determined to be accurately positioned relative to the sensor and hence the collation machine 120.

In the above example, the component 102d is used but other components may be used. For example, component 102c may be used as the reference by moving the sheet such that the first component 102d passes the sensor and the signal declines before rising again as the component 102c comes into view.

Referring to FIG. 4, it will be appreciated that whilst the sensor 104a may be accurately positioned relative to the components in the top right feature (e.g. the antenna coil), if the sheet 100 is not square with the collation machine, i.e. it is rotated slightly, then the other components in different parts of the sheet may be misaligned. It is therefore important to ensure not only that the sheet is aligned in the axis of movement but that it is rotationally aligned too.

To ensure that the sheet is properly aligned, the second sensor 104b can be used in conjunction with sensor 104a. When sensor 104a is used, the sheet is moved forwards and backwards (150, 151), as described above, to align the components with sensor 104a. A similar process is carried out using sensor 104b. This may be done sequentially by aligning the entire sheet using sensor 104a and then realigning the sheet using sensor 104b and moving only one side of the sheet (151) to introduce a rotational (yaw) movement.

For example, when aligning initially, based on sensor 104a, the grippers 130a and 130b may be moved in tandem to translate the entire sheet left and right (along the X-axis shown in FIG. 4). Once the sensor 104a is aligned, then sensor 104b may be used to adjust the alignment by moving (151) only gripper 103b to move the lower part of the sheet 100 (as seen in FIG. 4) left and right to align it. This alignment movement may cause small movement of the upper part of the sheet and put the sheet out of alignment relative to sensor 104a. To deal with this, alignment may be repeated using sensor 104a and using gripper 103a alone or in combination with gripper 103b to move the sheet. This process may be repeated a number of times depending on the required accuracy.

It will be appreciated that other techniques may be used to achieve alignment of the sheet relative to the sensors 104a and 104b and hence the collation machine 120. For example, rather than carrying out adjustment sequentially, the adjustments may be done simultaneously. A controller can be used to drive the respective grippers 130a and 130b based on the outputs from respective sensors. Other elements may be used for adjusting the position of the sheet instead of the grippers 130a, 130b, such as gripper 130c.

FIG. 4 shows a further sensor 104c which may be used in conjunction with the other sensors or for example in place of sensor 104b. The sensor 104c is aligned perpendicular to sensors 104a and 104b and may be used to align the sheet relative to the Y-axis. This can also be used for further correcting the rotational alignment of the sheet. The sensors 104a and 104b may only detect the components 102a-102d in the X-axis. Any misalignment along the Y-axis may not be detected by the sensors 104a and 104b as the profile of the parallel components looks the same when scanned in the X-axis, at different positions in the Y-axis. So, once the alignment in the X-axis is completed, alignment in the Y-axis can be undertaken in a similar way using sensor 104c and moving (152), e.g., using 130c, the sheet perpendicular to the direction (150, 151) used with sensors 104a and 104b. A single sensor should be enough, as any rotational misalignment should have been corrected using the sensors 104a and 104b. So, alignment using the single sensor 104c should be only required for translational alignment in the Y-axis. However, it is possible and may be desirable to have two sensors for Y-axis alignment, operating in a similar way to the sensors 104a and 104b. For example, sensor 104d shown in dotted line may optionally be provided.

The alignment process may alternatively be carried out by aligning the Y-axis first and then aligning the X-axis. The rotational (yaw) adjustment may be carried out during the Y-axis adjustment using sensor 104c and an additional Y-axis sensor (e.g. 104d). The X-axis adjustment may then be carried using sensor 104a. Sensor 104b may optionally be dispensed with for the same reasons as 104d mentioned above, as rotational adjustment may not be necessary.

Alignment in both axes may not always be required and so some of the translation alignment steps may not be required.

The sensors 104a-104c are shown located close to the corners of the sheets. The greater the spatial separation between them, the greater the accuracy of positioning of the sheet 100. It is therefore desirable to set the sensors apart from each other although this is not essential. The positions shown in FIG. 4 are not limiting and they may be arranged in a number of ways.

The above arrangement is described in relation to the specific sheet layout but it will be appreciated that the collation machine 120 may be configured to operate with different sheets. Once the layout of the sheet is known, suitable alignment features of the components on the sheet may be identified. These may in theory be anywhere on the sheet as long as the features of the component allow it to be positioned accurately. For example, the identifying component could be located centrally on one edge of the sheet. The sheet would be fed into the collation machine as described above to roughly align the sensor with the identifying component. The small adjustment movements can then be carried out to accurately align the identifying component with the sensor. A different sensor may then be used to align the sheet rotationally.

If the sensors are in a fixed position on the machine, then the identifying component on a sheet may not necessarily correspond to the position of the sensors. In the example shown in FIG. 4, the sensors are preferably positioned to correspond to the identification features (shown under the sensors in FIG. 4). This means that alignment of the sheet can be carried out because the alignment features and the sensors are positioned in the same way relative to each other.

Figure 7A:
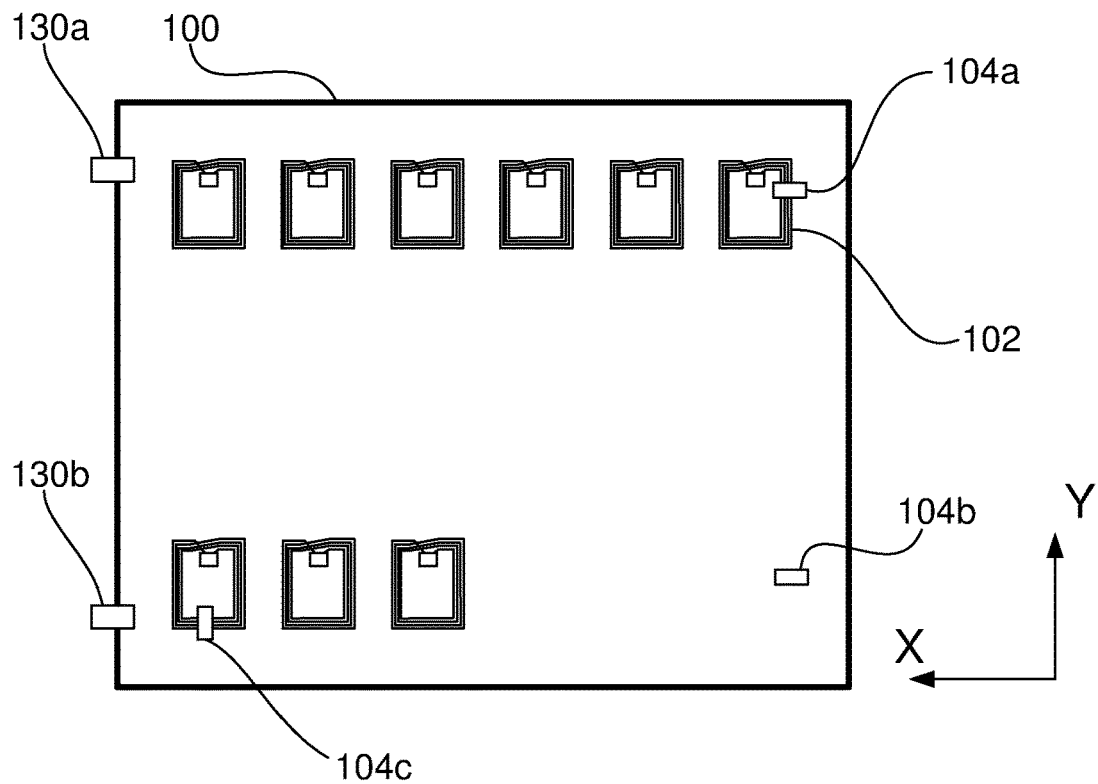
FIGS. 7a and 7b show an alternative alignment process.
Figure 7B:
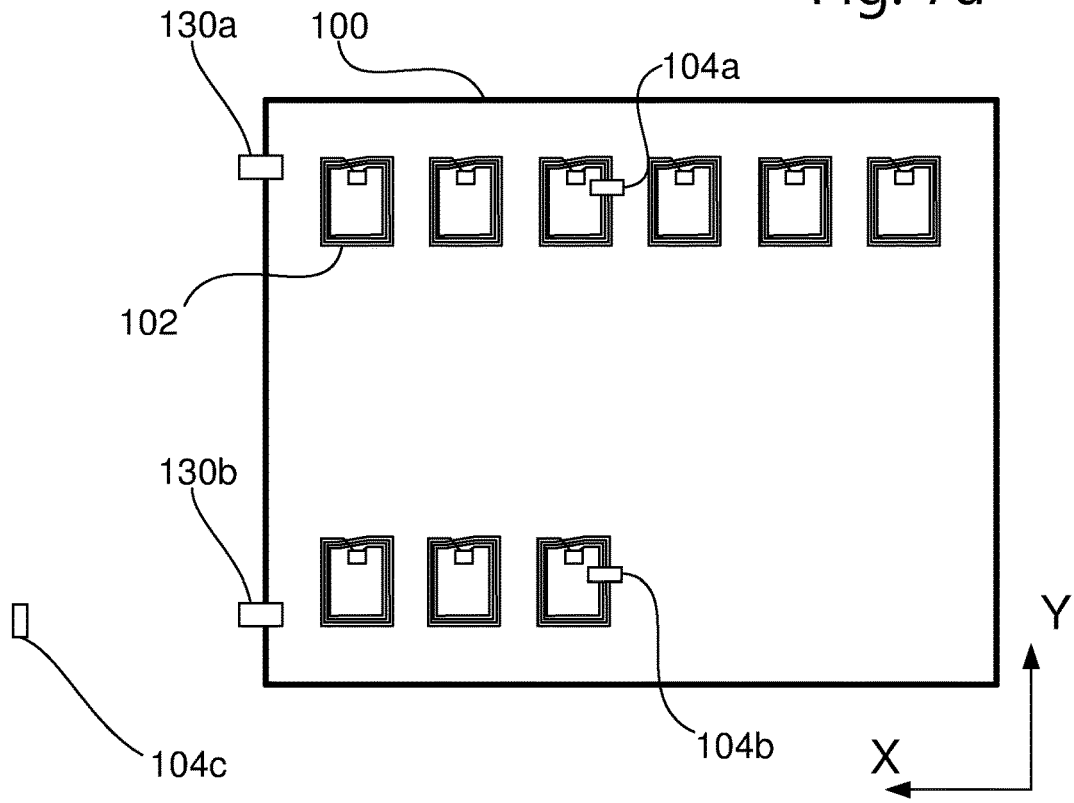

However, if the machine has been set up with sensors in specific places as shown in FIG. 4, this may not be convenient if a different sheet layout is required, without having to move the sensors. However, for example the sheet in FIG. 7a, does not have features in the bottom right corner and so the sensor 104b is not able to align the sheet in that position. However, as before, the sensor 104a can be used initially to align the sheet to that sensor. After that alignment has been carried out, the sheet can be moved to the right by a predetermined amount corresponding to the known separation between the two features so that the sensor 104b should be aligned with the correct feature, shown below it in FIG. 7b. Once in position any error can be corrected as before to accurately align sensor 104b with the feature below it. Again, if a second adjustment using sensor 104a is required then the gross movement can be carried out to move the sheet back to the theoretical alignment point with sensor 104a. These gross movements are controlled by the collation machine and can be carried out with high accuracy. This allows the sheet to be aligned in a similar way to that described above but without needing to adjust the sensors for each different layout. As any orientational offset may be amplified by such gross movement, then additional alignment steps may be used to provide an iterative alignment process to compensate.

It will be appreciated that a similar procedure can be used to move the sheet prior to carrying out the Y-axis adjustment. If the position of the Y-axis sensor 104c is not compatible with the layout of the sheet, then the sheet may be adjusted after X-axis alignment to position the alignment feature of the sheet with the Y-axis sensor 104c using a defined gross movement of the sheet.

The components used as alignment features in the sheet may be active components provided as part of the function or utility of the card or they may be essentially redundant in terms of the function of the card once constructed and serving only as reference features for alignment in the collation machine. For example, a simple section of straight wire or surface printed metallic material might be included on or in the sheet. It may not be connected to anything and may ultimately be discarded because it lies outside of the parts of the sheet destined to become cards. This still allows the inductive sensing to be used without the need to use the additional print step as would be required in the prior art. This may be useful where the sheet includes active components and the additional step of including non-active reference features adds little or nothing to the cost. It may also be desirable where there are no convenient features of the active components of the card to use as reference features.

The above embodiments relate to sheets used for forming payment cards or the like. However, it will be appreciated that the invention may be applied to other products where sheets need to be aligned. This can be achieved by including metallic reference features in or on the sheet to allow alignment of the sheet with the sensors and in turn align the sheet with the machine.

The inductive sensors 104 are preferably arranged in fixed and relatively close proximity to the sheets as they pass by. As the metallic components in the sheets pass by, they are detected by the sensor to produce an output. As the metallic component approaches the sensor, the signal will increase to a peak, typically when the component is at its closest to the sensor. In this way, the peak output can be used to accurately and repeatedly determine the position of the component relative to the sensor. This allows the position to be determined to accuracies of around 0.1 mm to ensure highly accurate alignment of the sheets. Alternatively, the sensors may be used to detect the edge of a larger metallic area where the reference signal will rise to a peak and reach a plateau. This can again be used to identify the reference edge for alignment.

The gripper described in the embodiment above typically makes use of two parts brought together on either side of the sheet to clamp the sheet between the gripper parts to allow the sheet to be moved by the gripper. However, it will be understood that other means may be used, as mentioned above. Suction elements may be used which are brought into contact with the sheet and then a reduced pressure established between the sheet and the suction element to temporarily engage the suction element with the sheet to allow movement of the sheet. Other methods may include one or more nudging elements that push the sheet one direction or another to provide movement of the sheet. The sheets may be supported on one or more moving platforms to move them into position. Other methods may be employed such as air cushions and blowers, inductive traction and so on.

The sheets may be aligned above or below the corresponding sheet to which they are to be attached, or may be aligned to the machine and then further moved into position relative to the sheet to which they are to be attached.

In the embodiment above, separate sensors are described for detecting the metallic features of the sheets. In the embodiments separate sensors are described but it will be appreciated that a single sensor may be used to detect features in different locations. For example, an initial adjustment may be carried using a sensor positioned where the first sensor 104a is shown. The sensor may then be precisely moved, relative to the collation machine 120, to where the second sensor 104b is shown and the further adjustment carried out. In a similar way, the sensor may be used to carry out the alignment relative to the Y-axis by positioning where sensors 104c and 104d are shown. As described above, the location of the sensing position is not critical as long as the position of the sensor relative to the machine is known or determined accurately.

It will also be appreciated that rather than move the sheet relative to the sensors which are held in a fixed position relative to the collation machine 120, the sheet may be held stationary relative to the collation machine 120 and the sensor or sensors moved relative to the machine and the sheet to determine the location of the features of the sheet.

The above embodiment provides a technique for aligning a sheet with an apparatus in a defined way. In this way, a sheet can be aligned with another sheet by reference to the apparatus. This ensures the sheets are aligned with each other and allows processes to be carried out on the two aligned sheets that require precise alignment, such as laminating the sheets together or making electrical connections between them.

The alignment process may also be used where only a single sheet is to be processed. That may be a composite sheet produced by alignment of component sheets or with just a base sheet. The process of alignment is the same in that it relies on location of the metallic components within the sheet to achieve reliable alignment relative to the machine.

This accurate alignment can then be used to carry out mechanical tasks on the sheet which need to be precisely located on the sheet. For example, a sheet of credit cards is formed from various laminated sheets. Once the finished card sheet is produced, it will need to be divided into the individual cards. This may be done by cutting, guillotining, punching, etc. the cards from the sheet. The cards need to be aligned with the tools to ensure the cuts etc. are in the precise location to ensure the cards are the correct shape and the print and electrical elements, such as the contact pad are in exactly the right location when they are used in card readers.

Similarly, the sheets may be used to form other items such as gift cards or the like where the main card may be attached to a carrier or other residual part of the sheet. For example a gift card may be attached to second card portion which is used to attach the card detachably to packaging or a display mounting. In this case, the card and residual piece of the sheet may be cut out together so that they remain connected. However, to aid separation by the user, the two parts may be scored or creased to weaken the material and define the separation point. This scoring or creasing process will typically also require precise alignment.

The method set out above can therefore be used for aligning a sheet with the processing apparatus to ensure the processing is carried at precisely the right location and orientation.

In an alternative embodiment, the indicative sensor may be replaced by alternative detection techniques. Inductive sensing can be used to identify metallic objects buried in a substrate that is difficult or possible to see using visible light due to the opacity of the sheet material. The inductive sensors are able to detect thin wires buried in the sheet and even discern individual wires from adjacent wires.

However, the wires are often formed into windings which may include several turns within the card structure. It is generally desirable to bring the windings close to each other to aid in operation and simplify manufacturing. As the wires are brought closer together, it becomes harder to differentiate them from each other. The inductive sensor may then detect several winding wires as one. However, this tends to reduce the accuracy of the positioning.

As an alternative to detecting the wires inductively, in an alternative embodiment, the sheet can be illuminated from one side with a light source, ideally infrared light. The wires buried in the sheet tend to obstruct the passage of the light through the card and so form a shadow or silhouette when observed from the upper surface. By providing a suitable image sensor above the card (or vice versa if the illumination is from above) the position of the wires can be detected.

In this way, the embodiment described above can be modified by providing an infra-red light source. Other sources of illumination may be used, such as ultra-violet, x-ray, radio frequency etc. The source of illumination can be selected according to the properties of the material used and other parameters of the sheet and components. By providing a source of illumination on the opposite side of the sheet to the image sensor, the material of the sheet is backlit. The components within he sheet will affect the transmission of the infra-red light through the sheet and this will lead to variations in the intensity, similar to casting shadows where the components within the sheet obstruct the passage of infra red light or alternatively where the components are more conductive that the sheet material, the infra-red light conduction will eb enhanced relative the sheet.

FIG. 8 shows a schematic view of the infra-red sensor arrangement. A light source 801 is arranged beneath the sheet 100 to illuminate the underside, as shown by the arrows. As the infra-red light passes through the sheet the intensity is attenuated differently depending on the components within the sheet. The intensity, shown by the length of the arrows, of the light passing through the sheet is lower where the wire components 102 are located and the light may be obstructed completely. The infra-red sensor 802 detects the transmitted light and can use the relative intensity to identify the position of components within the sheet. As the sheet is moved relative to the sensor 802, the variation in intensity can be monitored so that the sheet can be positioned precisely relative to components within the sheet.

In either case, the variations in the intensity of infra-red light received allow the location of the components to be identified. As described in relation to the inductive detectors above, as the sheet is translated past the sensor, these variations in intensity allow the features of the components within the card to be detected and the precise location to be identified.

The inductive detection method provides a good way of detecting metallic components within the sheet. The infra-red detection provides a way of detecting components which are not easily detected using induction. However, as metallic components will also obstruct infra-red light, it can be used with metallic components too.

Furthermore, the resolution of the infra-red detection can be higher than that achievable using inductive detection and so may allow for more accurate positioning of the sensors relative to the components. For example, where multiple separate metallic components are arranged close to each other, such as wires 102a-d shown in FIG. 6, the inductive detector may be less able to resolve one wire form the next as they are arranged closer together. Therefore where the wires are to be positioned close together an infra detection technique may be preferred.

The backlit technique described above may be used in conjunction with the inductive detection technique, either with separate detectors or with an integrated sensor which may include an inductive detector and an infra-red (or other illumination) detector. This can allow for selective use of one or the other, for example to allow for accurate positioning of different types of sheet that might be used on a machine. Alternatively, they may be used in conjunction to provide more accurate positioning of verification of one by the other.

In the above embodiments, the sensors are primarily used to align the sheets relative to the processing machine by translating the sheets to align them relative to sensors. It will be appreciated that a combination of translation in different directions may be used to position the sheets and this may also be used to provide rotation of the sheets relative to the processing machine. Alternatively, the sheets may be mounted in a rotatable manner so that they can be directly rotated, possibly also in combination with being translated to correctly align and locate the sheets.

As noted above, the alignment of the sheets relative to a processing machine provides a method for accurately positioning the sheet so that it can be processed further. This can include lamination steps where it can be attached to other sheets which are in a known alignment with the processing apparatus and therefore with the sheet. It can also be used for processing operations carried out by the processing machine or ancillary devices, on a sheet or laminated structure (comprised of multiple sheets). For example such operations may include cutting, punching or guillotining operations. Alignment may be used for other operations such as marking, applying creases, markings or other elements to the sheets, printing on the cards or even in readiness for feeding the sheet on to another machine or process. With the invention, these alignment operations may be carried out using the components within or on the sheet or laminated structure without having to provide additional marks such as by pre-printing etc. or relying on the edges of the sheet.

The invention claimed is:

1. An apparatus for aligning a sheet of material relative to said apparatus, said apparatus comprising:
    a plurality of sensors, each arranged at a known position relative to said apparatus and arranged to detect a sensor feature in said sheet;
    a first moving means for adjusting the relative position of said sheet and a first sensor of said one or more sensors;
    a second moving means for adjusting the relative position of said sheet and a second sensor of said one or more sensors; and
    a controller arranged to:
    receive output from said first sensor and to control the first moving means to align a first sensor feature with said first sensor, and
    receive output from said second sensor and to control the second moving means to align a second sensor feature with said second sensor,
    wherein said first and second moving means are arranged to independently manipulate said sheet to selectively translate said sheet in a first direction or rotate said sheet.

2. The apparatus of claim 1, wherein said controller is arranged to carry out a first alignment step to align said first sensor feature with said first sensor using said first moving means prior to carrying out a second alignment step to align said second sensor feature with said second sensor using said second moving means.

3. The apparatus of claim 2, wherein said controller repeats said first and second alignment steps one or more times for each sheet.

4. The apparatus of claim 1, further comprising:
    a third of said one or more sensors arranged at a known position relative to said apparatus and arranged to detect a third sensor feature in said sheet; and
    a third moving means for moving said sheet relative to said third sensor, wherein said controller is arranged to receive output from the third sensor and to control the third moving means to align said third sensor feature with said third sensor.

5. The apparatus of claim 4, wherein said controller is arranged to carry out a third alignment step to align said third sensor feature with said third sensor using said third moving means after carrying out said first and second alignment steps, to align said third sensor feature with said third sensor using said third moving means.

6. The apparatus of claim 5 wherein said third moving means is arranged to move said sheet in a second direction different to said first direction.

7. The apparatus of claim 4, wherein each of said first, second and third moving means is arranged to move the sheet relative to the apparatus whilst the respective sensor is stationary relative to the apparatus.

8. The apparatus of claim 1, wherein each of said one or more sensors detects a sensor feature in said sheet and produces a signal corresponding to the relative proximity of said sensor feature, wherein as the sheet is moved past the sensor the signal peaks when the sensor feature is at its closest to the sensor.

9. The apparatus of claim 1, wherein a single movable sensor provides the function of one of said one or more sensors in a first position and said single moveable sensor provides the function of another of said one or more sensors when moved to a second position, the first and second positions being defined locations relative to the apparatus.

10. The apparatus of claim 1, wherein at least one of said one or more sensors includes an inductive detection means for detecting metallic sensor features in said sheet.

11. The apparatus of claim 1, wherein at least one of said one or more sensors is an infra-red detection means for detecting said sensor features in said sheet.

12. The apparatus of claim 11 further comprising an infrared light source directed towards said infrared detection means, wherein said infrared detection means detects infra-red light passing through a sheet of material interposed between said light source and said infra-red detection means.

13. A method for aligning a sheet of material relative to a fixed reference, the method comprising:
   providing a first sheet for alignment with said fixed reference, said first sheet having a first sensor feature;
   a first moving step of moving said sheet in a first direction relative to a first sensor arranged at a known position relative to said fixed reference,
   detecting said first sensor feature in said sheet using said first sensor; and
   ceasing movement of said sheet when said first sensor feature is positioned at a defined position relative to said first sensor.

14. The method of claim 13 further comprising:
   a second moving step of moving said sheet relative to a second sensor arranged at a known position relative to said fixed reference,
   detecting a second sensor feature in said sheet using said second sensor; and ceasing movement of said sheet when said second sensor feature is positioned at a defined position relative to said second sensor.

15. The method of claim 14, wherein said first moving step is carried out prior to said second moving step.

16. The method of claim 15, wherein at least one of said first moving step and said second moving step are repeated at least once.

17. The method of claim 14, wherein said first and second moving steps are arranged to independently manipulate said sheet to selectively translate said sheet in a first direction or a second direction respectively, or rotate said sheet.

18. The method of claim 14, further comprising:
   a third moving step of moving said sheet relative to a third sensor arranged at a known position relative to said fixed reference;
   detecting a third sensor feature in said sheet using said third sensor; and
   ceasing movement of said sheet when said third sensor feature is positioned at a defined position relative to said third sensor.

19. The method of claim 18, wherein said third moving step is carried after said first and second moving steps.

20. The method of claim 19 wherein said third moving step is in a second direction different to said first direction.

21. The method of claim 18, wherein each of said first, second and third moving steps is arranged to move the sheet relative to the fixed reference whilst the respective sensor is stationary relative the fixed reference.

22. The method of claim 18, wherein at least one of said first, second and third sensors includes an inductive detection means for detecting metallic sensor features in said sheet.

23. The method of claim 18, wherein at least one of said first, second and third sensors is an infra-red detection means for detecting said sensor features in said sheet.

24. The method of claim 23 further comprising an infrared light source directed towards said infrared detection means, wherein said infrared detection means detects infra-red light passing through a sheet of material interposed between said light source and said infra-red detection means.

* * * * *